Nov. 5, 1929.  W. F. McLAUGHLIN ET AL  1,734,141
FILM SPLICER
Filed April 8, 1927  3 Sheets-Sheet 3

INVENTORS
William F. McLaughlin
Alfred J. Swing
BY
Martin T. Fisher
ATTORNEY

Patented Nov. 5, 1929

1,734,141

UNITED STATES PATENT OFFICE

WILLIAM F. McLAUGHLIN AND ALFRED J. SWING, OF BLOOMFIELD, NEW JERSEY, ASSIGNORS TO AUTOMATIC FILM MACHINE CORPORATION, OF NEW YORK, N. Y., A CORPORATION OF DELAWARE

FILM SPLICER

Application filed April 8, 1927. Serial No. 182,144.

This invention relates to apparatus used in repairing torn, broken or otherwise locally damaged moving picture films, restoring them to a condition of renewed usefulness.

Such an apparatus is indispensable wherever films are extensively used and are adjunctive to projection, exhibition and inspection apparatus in general.

A film mending or splicing apparatus in order to be successful must include the advantages of rapid operation, as time consumed in the operation is time lost.

It must perform the operations of clamping the portions of the film securely or further damage may be caused; it should remove all traces of the sensitizing emulsion from the surface of the film at the joint to be made in order that an adhesive may make direct contact with the surface of the film, rather than the surface of the emulsion to which it will not stick or if it does, is subject to peeling off, allowing the ends to separate.

The cutting of the film ends should be clean across, the adhesive applied only upon the portion to be moved into engaging relation to avoid fouling the surface of the film and possible opacity of adjacent portions, move the ends into overlapping relation and with respect to the openings in their margins, and finally to press the ends firmly together as the adhesive unites the superposed ends, all of these several operations being performed in sequence progressively and substantially at a continuous operation.

The improvement consists in providing a series of related devices for performing the foregoing functions in an advantageous manner by the novel construction and combination of parts, arranged as a unitary structure, as hereinafter described and shown in the accompanying drawings, constituting an essential part of this disclosure, and in which:

Figs. 6 to 9 show the film at various stages of treatment accorded it in the operations of splicing.

Figure 1:
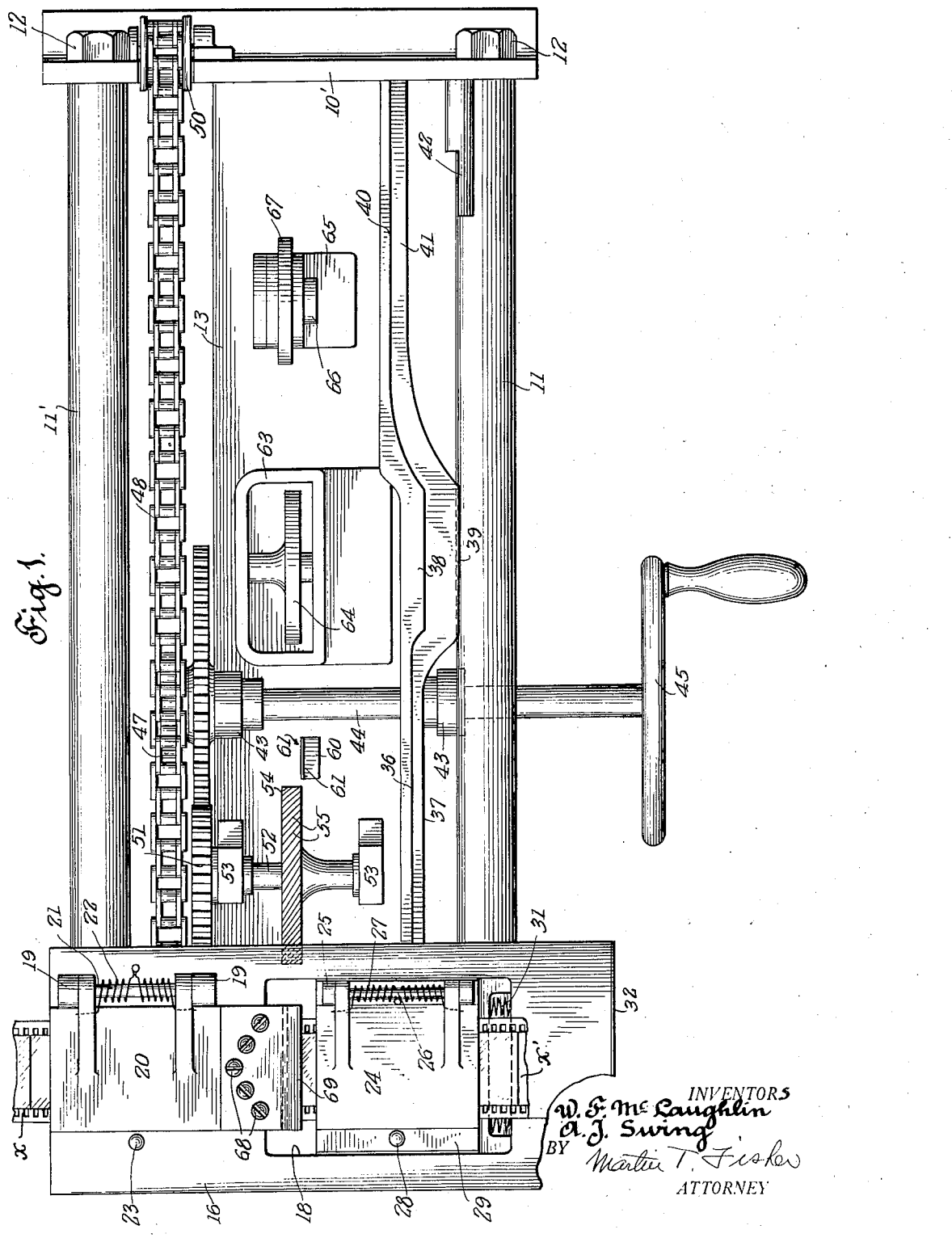
Fig. 1 is a top plan view of an approved embodiment of the invention shown as engaging a film in the initial stage of operation.
Figure 2:
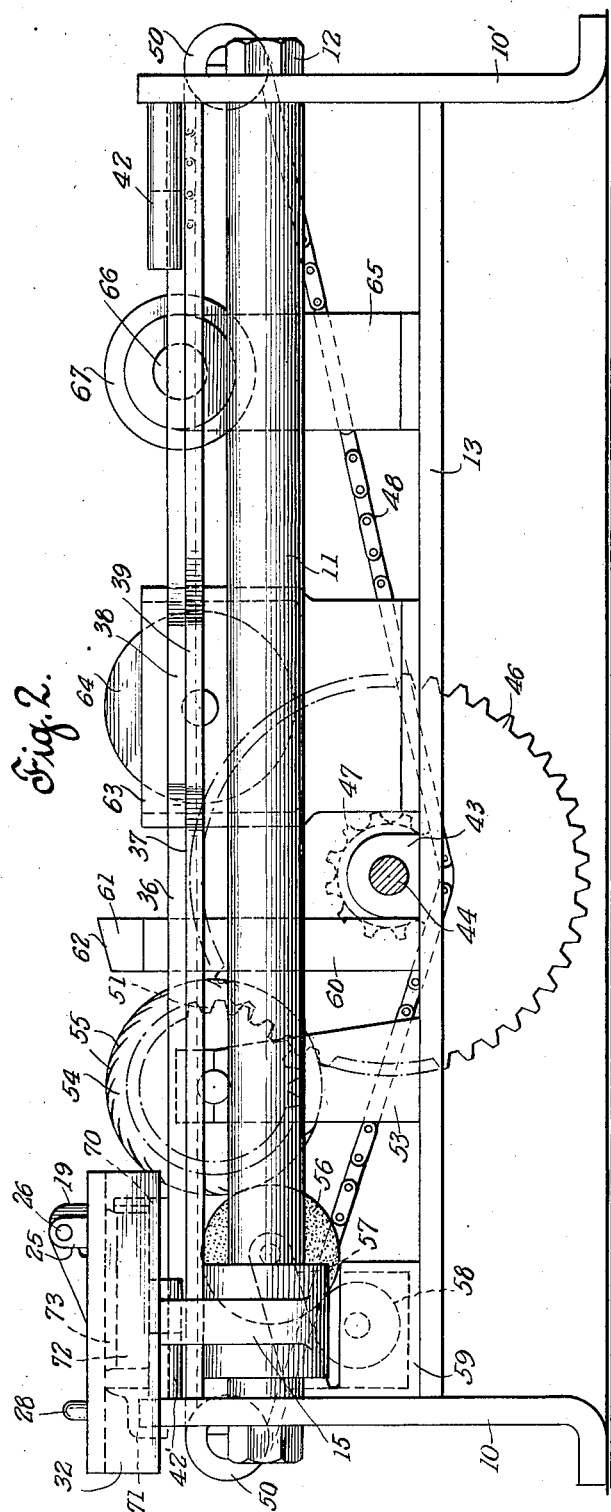
Fig. 2 is a side elevational view of the same, the operating shaft being shown in section.
Figure 3:
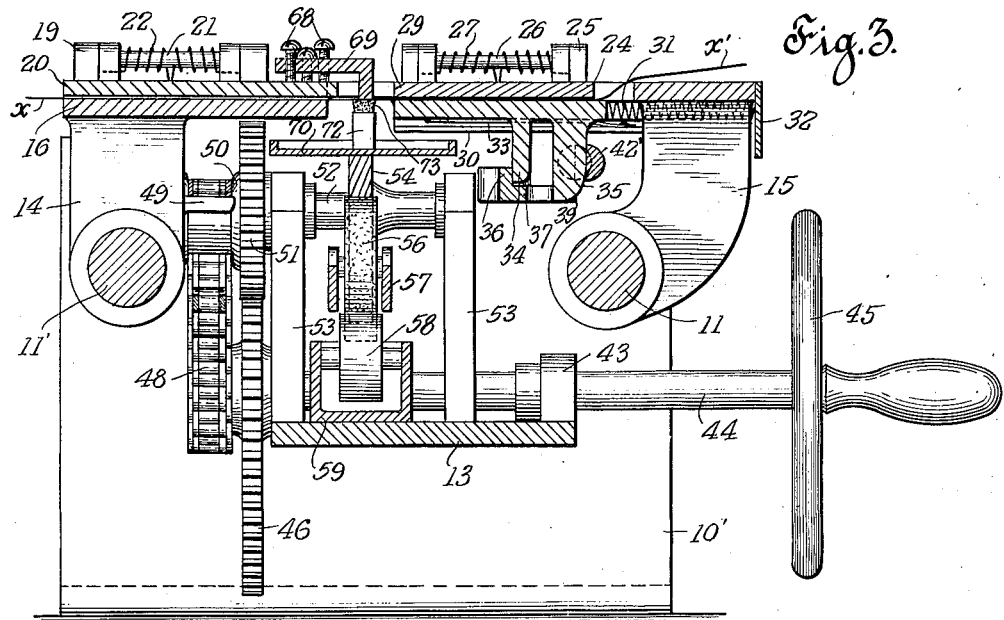
Fig. 3 is a transverse sectional view taken through the operative portion of the structure.

In Figs. 1, 2 and 3 are shown a pair of opposed spaced standards 10 and 10' outturned at their lower ends to rest upon any convenient surface, these standards being connected by a pair of cylindrical bars 11 and 11' arranged at a uniform height and held rigidly in place by nuts 12, these bars constituting a trackway as will later be seen.

Fixed to the inner surfaces of the standards to extend therebetween in a plane below the bars 11, is a level horizontal platform 13 on the upper surface of which are secured the several main elements of the apparatus.

Slidable on the track-way are brackets 14 and 15, respectively rear and front, the latter being bowed outwardly at the front; both these brackets extend upwardly and are united to a carriage composed of a plate 16 having at the center a recessed portion reaching to a rectangular opening 18, this carriage extending transversely across the apparatus.

A pair of lugs 19, raised from the plate 16, act as hinge members for a cover 20, the hinge pin 21 being encircled by a torsional spring 22 urging the cover downward and a clip 23 is provided to retain the cover when closed over an entered strip of film designated by the character X.

The other end X' of the film is held below a similar cover 24 having hinge elements 25 connected by a pin 26 surrounded by another torsional spring 27 and provided with a catch 28, this catch and hinge lugs 25 being held on raised portions of a shiftable carrier 29 extending upward through the opening 18 in the carriage.

The carrier 29 is slidable limitedly longitudinally in the opening on guides 30 fixed to the carriage and is pressed towards the rear of the apparatus by springs 31 backed by a plate 32 attached to the front edge of the carriage.

Figure 4:
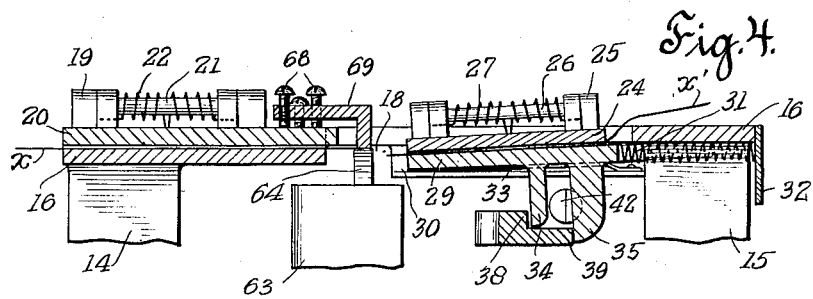
Fig. 4 is a partial transverse sectional view, showing the film carriage advanced to a point midway of the length of the structure, one of the film ends receiving an adhesive and the other spaced and depressed preliminary to being carried under the adherent end.
Figure 5:
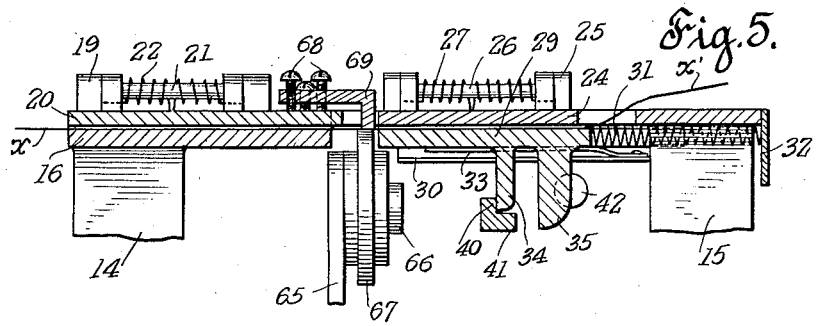
Fig. 5 is a similar view of the same parts at a point where the superposed film ends are pressed into coherence.

The carrier is held normally raised by flat springs 33, fixed in the slides, to cause the ends of the films X and X' to register, as shown in Figs. 3 and 5, but is arranged to permit depression at its inner end, as shown in Fig. 4, by means further on described.

Reaching down from the under side of the carrier are a pair of lugs 34 and 35 to make contact with a cam bar extending horizontally between the uprights 10 and 10', the bar consisting of respective steps 36 and 37, on its front portion with which the carrier lug 34 normally engages, see Fig. 3, then to forwardly widened steps 38 and 39 approximately centrally along its length, the lug 35 making contact with the cam 39 causing the carrier to tilt, as shown in Fig. 4, the cam bar having steps 40 and 41 at the other end, offset towards the rear of the apparatus, the rear raised step 40 making contact with the carrier lug 34, permitting the springs 31 to operate in pressing the carrier into a forward position, as shown in Fig. 5.

Fixed to the standards 10—10', to reach inwardly and parallel with the cam bar, is a pair of recessed guides 42 and 42' arranged in offset relation and engageable with the lug 35 at the start and finish of the carrier motion, to retain the carrier in a horizontal plane and so insure registration of the film ends X—X'.

Journalled in bearings 43 on the plate 13 is a transverse drive shaft 44, actuated by a hand wheel 45, and having on its rear end, a large spur gear 46 and a small sprocket wheel 47, the latter engaging a chain 48 fixed to a lug 49 extending from the bracket 14 and trained over the sheaves 50 pivoted in the standards 10—10'.

Thus by revolving the hand wheel 45 the carriage, by virtue of its connections with the chain 48, will slide along the rails 11—11' in either direction.

The gear 46 engages a pinion 51 fixed on the rear end of a stub shaft 52 journalled in bearings 53 on the plate 13, the shaft carrying a cutting wheel 54, between the bearings having undercut diagonal cutting blade surfaces 55 frictionally engaging a felt roll 56 rotatable in lugs 57 extending obliquely from the standard 10.

The roll 56 is frictionally engageable with a smaller metal roll 58 journalled in a tank 59 fixed on the plate 13 adjacent the standard 10 and containing a cleansing liquid or solvent conducted by the rolls to keep the cutting wheel free from gumming, the wheel 54 with its sharp diagonal cutters operating to abrade and scarify the surface of a film passed over it as will later be seen.

Rising from the platform 13, intermediate the shaft 44 and the wheel 54, is a holder 60 supporting a knife 61, having an oblique cutting edge 62.

On the other side of the shaft 44 is a tank 63 fixed on the plate 13 and containing an adhesive, in which is journalled a dauber roll 64, its periphery being above the tank in a line with the wheel 54.

Between the tank 63 and the standard 10' is a vertical support 65 having a forwardly extending stud 66 on its upper, front surface, on which is rotatable, intermediate a pair of washers, a presser roll 67.

Adjustable on the cover 20, to be raised and lowered by screws 68, is a right angle presser foot 69 extending downwardly into the opening 18 intermediate the covers 20 and 24 to apply pressure on the film X—X' for a purpose later described.

Beneath the carriage is a pan 70, having an integral hook 71 engaged over the standard 10, in which is mounted a holder 72 supporting an elongated, rectangular wiper 73 adapted to carry a cleansing or solvent liquid in the pan, by capillary attraction, to the emulsion coated surface of the film.

In operation, the torn film ends X and X' are placed, in superposed relation as shown in Fig. 6, respectively on the plate 16 and carrier 29, the ends being held thereon by the covers 20 and 24.

The carriage may be moved over the rails 11—11' by revolving the hand wheel 45 and in such movement, the folowing operations are performed.

The wiper 73 cleans a transverse path across the film, pressing the same upwardly against the foot 69.

Continuing, the scraping blade surfaces 55 of the wheel 54 scarify the cleansed path to remove the emulsion, after which, the knife 61 cuts the film transversely on one edge of the scarified path, as in Fig. 7.

By this time, the lug 35 has engaged the step 39 of the cam bar, tilting the carrier 29 with the film end X' while the scarified path of the film end X, passes over the dauber 64, coacting the same with an adhesive.

After passing the cam step 39, the carrier 29, is pressed rearward by the springs 31 until the lug 34 engages the cam step 40, bringing the ends of the film into superposed relation as in Fig. 8, the adhesive carrying end X being on top.

The loose parts of the film are then removed and the cemented ends, as shown in Figs. 5 and 9, are pressed into coherence by passing the film between the presser roll 67 and the foot 69.

After the carriage reaches the standard 10', the mended film is removed, and the carriage is moved back to its initial position by revolving the hand wheel 45 in the opposite direction ready for successive operations.

Although the foregoing is descriptive of the preferred embodiment of the invention, it will be apparent that minor changes may be made in its construction, without the exercise of invention or conflicting with the scope of the claims hereto appended.

Having thus described our invention, what we claim as new and desire to secure by Letters Patent, is:

1. A film splicing apparatus comprising a frame including a pair of spaced standards having a platform and a pair of spaced rails connected therebetween, a carriage on said rails, manual means for moving said carriage on the rails, a carrier mounted to slide lengthwise in said carriage transversely of the platform, means for clamping film ends on said carrier and carriage respectively, means on said platform to progressively moisten, scrape, cut and cement the film ends, a cam bar having means to tilt the carrier and move it into position to cause the film end carried by it to overlap the film end on said carriage, and means for adjustably pressing the superposed film ends tightly together.

2. A film splicing apparatus comprising a frame including a pair of standards having a platform and a pair of spaced rails connected therebetween, a carriage on said rails, a chain trained over idlers at the ends of said frame, said chain being attached to said carriage, manual means for actuating said chain in either direction, a slide carried by the carriage, slidable in the carriage in a direction transverse to the movement of the carriage, means to clamp the ends of a film to said slide and carriage respectively, a cam to move said slide in the carriage as it is advanced, and means fixed on said platform to progressively perform steps in mending the film as the carriage is moved in a forward direction.

3. In a film splicing apparatus, a trackway, a carriage movable along the trackway, the carriage having a part fixed thereto and a part slidable therein, in a direction transverse to the movement of the carriage, each part having means for clamping a film end thereon, a presser foot on said fixed part adjustable with reference to the plane of the film, a hand wheel to actuate said carriage along said track-way, a single cam bar adjacent said track-way over which the carriage moves, and means on the movable part of said carriage to engage said cam whereby the film ends are moved into superposed relation as said carriage is advanced.

4. The combination in a film splicing apparatus, of a circular disc having a series of scraping knives disposed diagonally on its periphery, means for rotating said disc, means associated with the rotating means to move a film transversely over said knives to cleanse the same, and means for applying moisture to said disc.

5. The combination in a film splicing apparatus, of a circular disc having a series of scraping knives disposed diagonally on its periphery, means for rotating said disc, means associated with the rotating means to move a film transversely over said knives, a liquid reservoir having a dispensing roll revoluble therein, and an absorbent felt disc mounted to freely rotate and convey moisture from said roll to said knives to wash and remove scrapings therefrom.

In testimony whereof we have affixed our signatures.

WILLIAM F. McLAUGHLIN.
ALFRED J. SWING.